United States Patent [19]

Moore

[11] 3,760,528
[45] Sept. 25, 1973

[54] PLASTIC FISHING WORM
[76] Inventor: Ray D. Moore, Goodlettsville, Tenn.
[22] Filed: Apr. 8, 1971
[21] Appl. No.: 132,389

[52] U.S. Cl. ............................................. 43/42.24
[51] Int. Cl. ............................................. A01k 85/04
[58] Field of Search .................. 43/35, 42.31, 42.33, 43/42.24

[56] References Cited
UNITED STATES PATENTS
2,613,471  10/1952  Traycik .......................... 43/42.31
3,120,074  2/1964  Messler ....................... 43/42.24 UX
3,497,985  3/1970  Margulies .............................. 43/35
2,636,304  4/1953  Swenson ........................... 43/42.24
D192,510  4/1962  Stembridge ................. 43/42.24 UX Primary Examiner—Robert W. Michell
Assistant Examiner—George M. Yahwak

[57] ABSTRACT

A plastic fishing lure in the general shape of a worm having head and tail portions. The head portion of the lure contains a metallic hollow chamber about a freely movable ball which produces a fish-attracting noise when the lure is pulled through the water.

1 Claim, 2 Drawing Figures

PATENTED SEP 25 1973 3,760,528

Ray J. Moore

PLASTIC FISHING WORM

This invention relates to improvements in plastic fishing worms and the primary object of the present invention is to provide a plastic fishing worm which, by its wiggling motion and sound producing characteristic, will attract the fish thereto.

Another object of the invention is to provide a plastic fishing worm having an elongated transparent body and cavity therein of lustrous material and a freely movable ball contained within the cavity that will cause the emission of sound and a flashing apperance is obtained.

A further object of the invention is provided the plastic fishing worm with a elongated body made up of several humps and a large flat tail.

With the above and other objects and advantages in view the invention consists of the novel details of construction, arrangement and combination of parts more fully hereinafter described, claimed and illustrated in the accompanying drawings in which corresponding and like parts are designated by the same reference characters throughout the several views.

In the preferred form illustrated, the plastic fishing worm comprises a soft buoyant flexible humped solid longitudinal body 1 of a shape simulating more or less that of a worm or eel. The body is formed of a soft flexable material, it being preferred to use a plastic which can be molded in various colors which is at least in part transparent.

Figure 1:
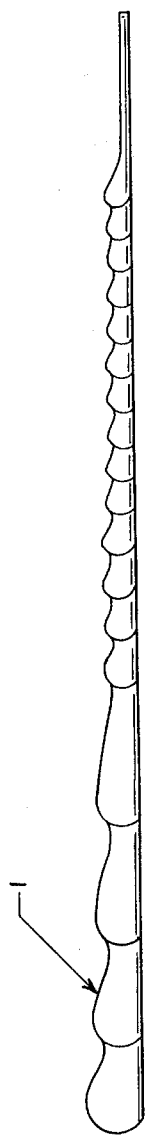
FIG. 1 is a side view of a plastic fishing worm embodying a preferred form of the invention.
Figure 2:
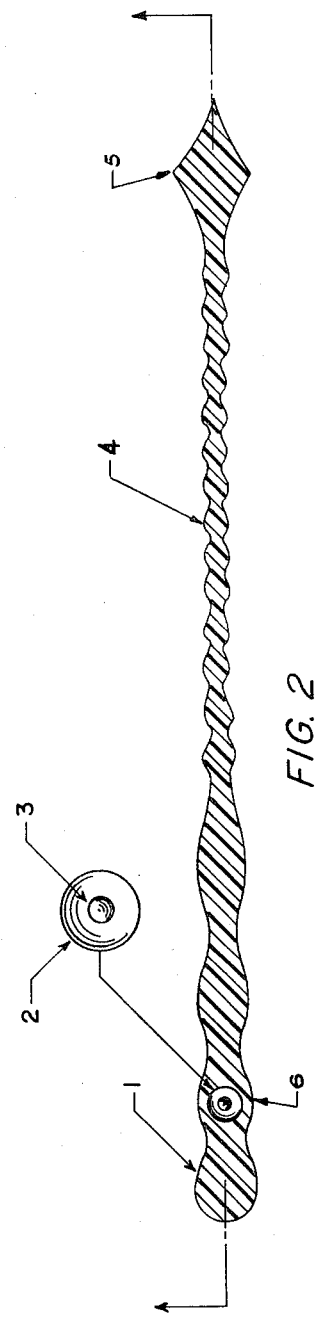
FIG. 2 is a top view with a enlarged view of 2.

Within the body 1 there is provided a chamber 2 which as is shown in FIG. 2 is circular in shape and contains a smaller ball 3. It is preferred to make the chamber of highly polished silvery metal and to provide transparent walls at least in the zone of the ball chamber. Thus the zone indicated by 6 FIG. 2 may be transparent or, if desired, the entire body 1 may be formed of transparent plastic.

A plastic fishing worm thus constructed provides an attractive fish lure in as much as it has been found that the transparent head portion 6 and the shiny surface of the ball chamber 2 creates flashes which attracts strikes. The rattling noise of the ball 3 striking against the walls of the chamber 2 and conducted through the water has the effect of attracting fish by the sound produced.

It will be noted that the slightest movement of the plastic fishing worm will cause the ball 3 to rattle in chamber 2, and the humped sections of the body 4 and the large flat tail 5 will catch on the slightest obstructions in the water which will cause the plastic fishing worm to look alive an make a rattling noise. All other plastic fishing worms that I am familiar with have none of these features.

It will thus be seen that the present invention provides an improved plastic fishing worm having a natural action simulating that of a live worm or eel together with a striking apperance and sound which serve to attract large fish from long distance.

The person that uses the plastic fishing worm will apply the hook to the plastic fishing worm in any manner in which he prefers.

While I have shown and described the invention as embodied in certain details of construction, it should be understood that this is primarily for the purpose of illustrating the principles of the invention and that the details of construction of the plastic fishing worm may be modified and changed by those skilled in the art without departing from the spirit or scope of the invention.

Having thus described the invention what is claimed as new and desired to be secured by Letters Patent is:

1. A buoyant plastic fishing lure comprising an elongated transparent body of generally worm-shape having a rounded segmented bulbous head portion and flat diamond-shaped tail portion and having within said head portion a spherical hollow chamber having a highly polished metal surface and having within said chamber a freely movable metal ball, whereby the highly polished metallic surface creates flashes of reflected light and the ball within the chamber creates a rattling noise upon striking the inside wall of said chamber whereby fish are attracted to said lure when the lure is pulled through a body of water.

* * * * *